US008875135B2

(12) United States Patent
Ma

(10) Patent No.: US 8,875,135 B2
(45) Date of Patent: Oct. 28, 2014

(54) ASSIGNING COMPONENT OPERATIONS OF A TASK TO MULTIPLE SERVERS USING ORCHESTRATED WEB SERVICE PROXY

(75) Inventor: Kevin Ma, Nashua, NH (US)

(73) Assignee: Cisco Systems, Inc., San Jose, CA (US)

( * ) Notice: Subject to any disclaimer, the term of this patent is extended or adjusted under 35 U.S.C. 154(b) by 1971 days.

(21) Appl. No.: 11/405,880

(22) Filed: Apr. 17, 2006

(65) Prior Publication Data

US 2007/0245352 A1    Oct. 18, 2007

(51) Int. Cl.
*G06F 9/46* (2006.01)
*H04L 29/08* (2006.01)
*G06F 9/50* (2006.01)

(52) U.S. Cl.
CPC ............ *G06F 9/505* (2013.01); *H04L 67/1008* (2013.01); *H04L 67/1002* (2013.01); *H04L 67/1029* (2013.01); *G06F 9/5038* (2013.01)
USPC ....................................................... 718/100

(58) Field of Classification Search
None
See application file for complete search history.

(56) References Cited

U.S. PATENT DOCUMENTS

| | | | |
|---|---|---|---|
| 5,535,387 A * | 7/1996 | Matsuoka et al. ............ 718/105 |
| 6,006,264 A | 12/1999 | Colby | |
| 6,247,141 B1 * | 6/2001 | Holmberg ........................ 714/2 |
| 6,438,597 B1 | 8/2002 | Mosberger | |
| 6,449,647 B1 | 9/2002 | Colby | |
| 6,484,143 B1 | 11/2002 | Swildens | |
| 6,606,643 B1 | 8/2003 | Emens | |
| 6,732,175 B1 | 5/2004 | Abjanic | |
| 6,742,022 B1 | 5/2004 | King | |
| 6,760,775 B1 | 7/2004 | Anerousis | |
| 6,772,211 B2 | 8/2004 | Lu | |
| 6,782,527 B1 | 8/2004 | Kouznetsov | |
| 6,788,648 B1 | 9/2004 | Peterson | |
| 6,801,528 B2 | 10/2004 | Nassar | |
| 6,850,982 B1 | 2/2005 | Siegel | |
| 6,862,624 B2 | 3/2005 | Colby | |
| 6,874,143 B1 | 3/2005 | Murray | |
| 6,912,588 B1 | 6/2005 | Jardin | |
| 6,920,498 B1 | 7/2005 | Gourlay | |
| 7,177,945 B2 * | 2/2007 | Hong et al. ................... 709/238 |
| 7,194,369 B2 * | 3/2007 | Lundstedt et al. ............ 702/104 |
| 7,769,802 B2 * | 8/2010 | Smith et al. ................... 709/201 |

(Continued)

OTHER PUBLICATIONS

Server Load Balancing With Radware'S WSD; http://www.rad-direct.com/Application-server-load-balancing.htm?menuId2=ApplicationMenu&manuID–LoadBalance; pp. 1-6, Apr. 17, 2006.

(Continued)

*Primary Examiner* — Meng An
*Assistant Examiner* — Eric C Wai
(74) *Attorney, Agent, or Firm* — Edwards Wildman Palmer LLP; James M. Behmke; Kenneth J. Heywood

(57) ABSTRACT

A load balancer or other network device in a server farm acts as a web services proxy and performs service orchestration among servers and other resources within the server farm. The load balancer receives an initial service request from a client and is able to optimize orchestration by assigning component operations of the service to multiple different servers. In this manner, a one-to-many allocation of resources can be mapped whereby a single client service request can result in multiple physical servers or other devices, processes or resources being used to handle the service request while maintaining a single back-end flow per multiple transactions.

17 Claims, 2 Drawing Sheets

(56) References Cited

U.S. PATENT DOCUMENTS

| | | | |
|---|---|---|---|
| 2002/0091752 A1* | 7/2002 | Firlie | 709/201 |
| 2003/0046335 A1* | 3/2003 | Doyle et al. | 709/203 |
| 2003/0236813 A1* | 12/2003 | Abjanic | 709/102 |
| 2004/0111725 A1* | 6/2004 | Srinivasan et al. | 718/105 |

OTHER PUBLICATIONS

Fontana, John; Vendors to Target XML Traffic Jam; Network Word; http://www.networkworld.com/news/2004/0503xmlace.html; pp. 1-4, May 3, 2004.

Shafer, Scott Tyler; Datapower Delivers XML Acceleration Device; InfoWorld; Aug. 27, 2002; pp. 1-3.

Cirtrix Netscaler 9000 Servies Overview; http://www.layer7solutions.com/9000_series_overview.htm; pp. 1-2, Apr. 17, 2006.

The New Cast Iron iA3000; http://www.castironsystem.com/whats_new.shtml; pp. 1-2, Apr. 17, 2006.

F5 Products; http://f5.com/products/bigip/ ; p. 1, Apr. 17, 2006.

Juniper Networks: DX Platforms; http://www.juniper.net/oroducts/appaccel/dca_/dx.html; pp. 1-2, Apr. 17, 2006.

Cisco Systems; Cisco CSS 11500 Series Content Services Switch; pp. 1-11, Apr. 17, 2006.

Andrews et al.; Business Process Execution Language for Web Services; © 2002, 2003 BEA Systems, International Business Machines Corporation, Microsoft Corporation, SAP AG Siebel Systems; pp. 1-136.

* cited by examiner

US 8,875,135 B2

ASSIGNING COMPONENT OPERATIONS OF A TASK TO MULTIPLE SERVERS USING ORCHESTRATED WEB SERVICE PROXY

BACKGROUND OF THE INVENTION

This invention relates in general to digital networks and more specifically to a system for improving load balancing and efficiency of web services processing.

The Internet and particularly the World Wide Web ("web") are being used increasingly for many types of operations and interactions. Increasing numbers and types of business transactions, educational functions, entertainment, recreational and other uses are being moved to the web each day. As this volume of "web services" increases, so does the need to provide effective and efficient handling of web services. Typically, a server computer is ultimately used for handling each component part of a web service transaction. Large collections of server computers are coordinated in a server "farm" where a service request from a user at a client computer or web browser is sent to an available server for processing. Alternative approaches rely on the client to perform service coordination.

The prior art maps a client service request to a server on a one-to-one basis, and maintains this mapping for the entire flow of the transaction. Other approaches attempt to aggregate multiple flows onto a single connection. In this case, the one-to-one mapping between client and server is still maintained although a many-to-one mapping may be used at a logical level. In other words, requests from multiple clients can be sent over a single Transmission Control Protocol (TCP) connection to one server.

DETAILED DESCRIPTION OF EMBODIMENTS OF THE INVENTION

In a preferred embodiment, a load balancer or other network device in a server farm acts as a web services proxy and performs service orchestration among servers and other resources within the server farm. The load balancer receives an initial service request from a client and is able to optimize orchestration by assigning component operations of the service to multiple different servers. In this manner, a one-to-many allocation of resources can be mapped whereby a single client service request can result in multiple physical servers or other devices, processes or resources being used to handle the service request while maintaining a single front-end flow per multiple back-end transactions. The load balancer traditionally has information about overall server farm operation such as current loads, use policies, etc., that can be used to coordinate and optimize the handling of a service request.

Figure 1:
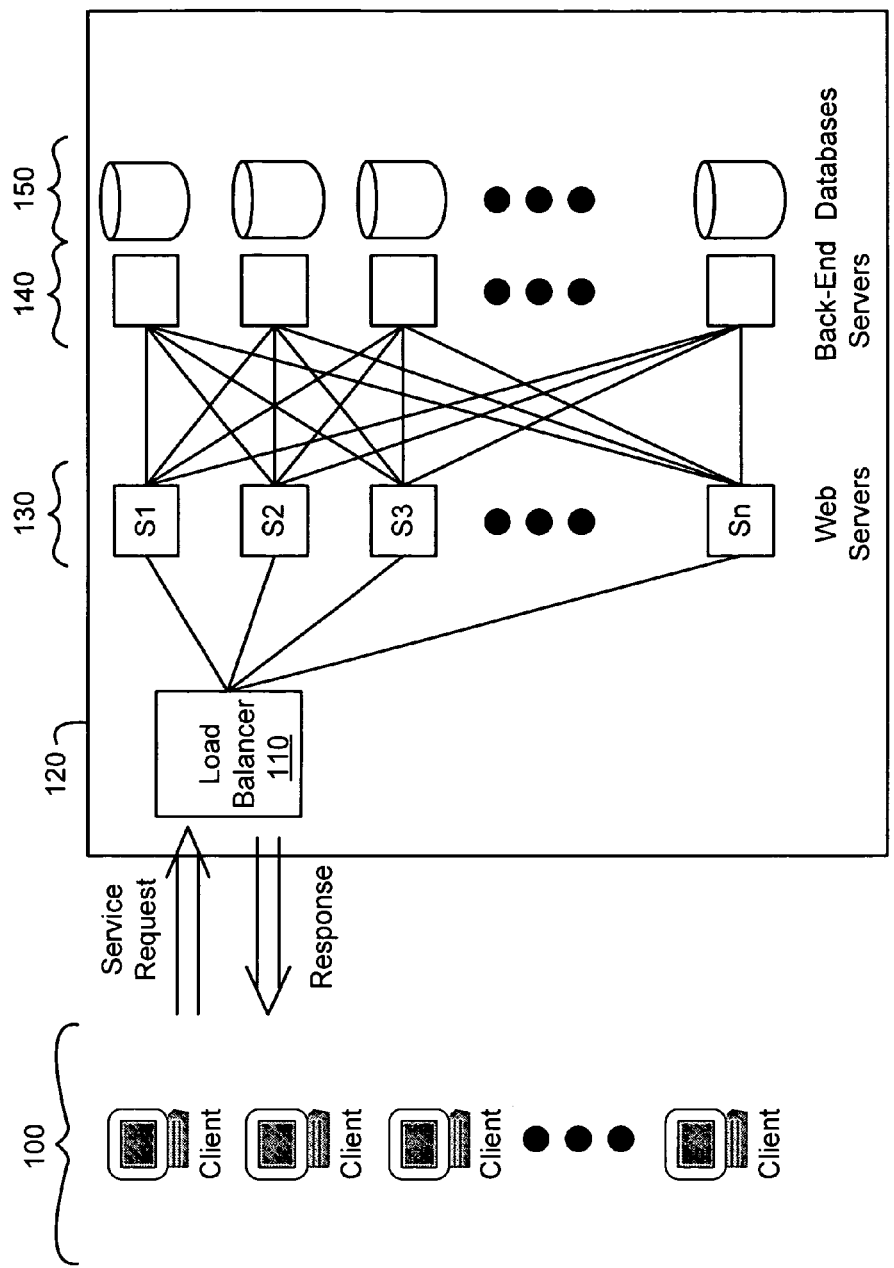
FIG. 1 shows a load balancer in a server farm system suitable for use with the present invention.

FIG. 1 shows a server farm 120, including load balancer 110 for distributing service requests from clients 100 to servers S1-Sn. Examples of load balancers are the Cisco Content Services Switch (CSS) Series 11500 models and the Cisco Content Services Module (CSM). However, any device that performs a load balancing function can be adapted with functionality described herein. Any other suitable types of devices, such as appliances or dedicated orchestration devices or processes, may be employed.

Web servers 130 are typically provided with additional resources such as back-end servers 140, databases 150 and other resources that are not shown. In general, any number, arrangement and type of servers and server resources can be used. In a preferred embodiment, load balancer 110 receives a service request from a client, divides the service request into multiple component operations, sends the requests for operations to two or more servers for processing, receives the responses from the servers and sends an integrated response to the client. A single client connection is maintained by the load balancer for an orchestrated response that uses multiple requests to, and responses from, multiple processing servers.

The load balancer can handle the server-side orchestration in different ways. One way is to use multiple back-end (i.e., load balancer to server) connections and transactions for multiple servers, where each transaction is a needed part of the client service request. In this "discrete" approach there is no redundancy of server transactions. Each different transaction is attempted once unless there is a failure. Whenever possible, transactions that do not have interdependencies are performed in parallel. In a second approach a particular transaction needed to respond to a client service request may be sent to more than one server for processing. In this "redundant" approach multiple servers are working on the same transaction or operation. The result from the first server to respond to the load balancer is then used and subsequent responses from the other redundant processing can be ignored.

Combinations of discrete and redundant approaches can be used. For example, some component operations of a service request can be handled discretely and others can be handled redundantly. Other aspects of service processing architectures can be employed such as synchronous or asynchronous servicing, dynamic or static service selection, sequential and parallel processing, etc. These aspects are discussed in more detail, below. Any suitable language, protocol or other mechanism or design can be used to implement load balancer orchestration. For example, Simple Object Access Protocol (SOAP), Business Process Execution Language (BPEL), Extended Markup Language (XML), Web Service Choreography Interface (WSCI), etc. can be employed.

Figure 2:
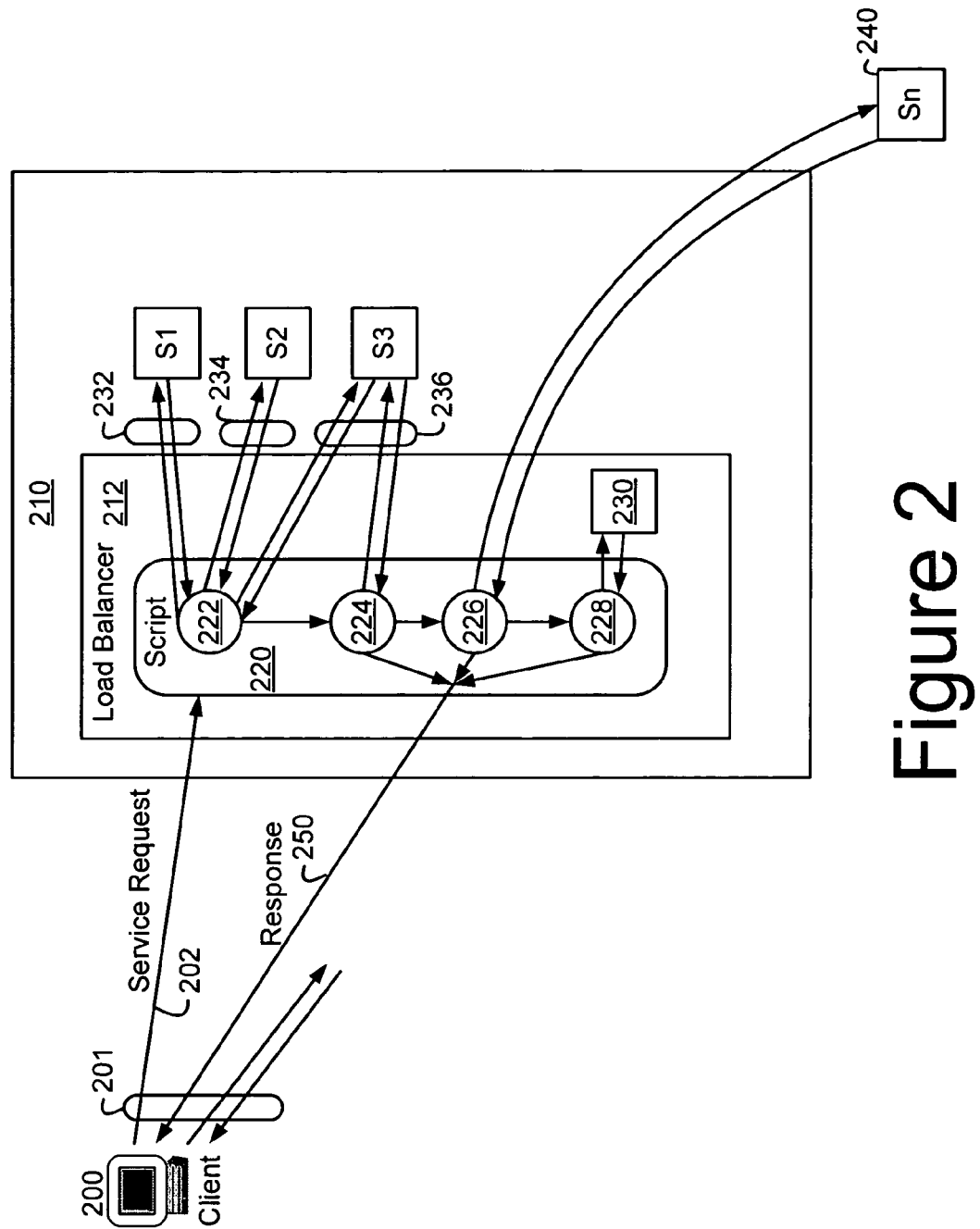
FIG. 2 illustrates steps in a specific service request that take place in a single front-end connection or flow.

FIG. 2 illustrates steps in a specific service request that take place in a single front-end (i.e., between the load balancer and client) connection or flow. Note that in any of the connections described or illustrated herein there may be any number of intermediary devices or processes that are not shown for ease of discussion. The steps illustrated in FIG. 2 are symbolic of the types of steps that could be performed in any specific type of service request such as obtaining a web page, approving a loan, retrieving personnel records, ordering a product, etc. In general, any type of service, function, transaction or other processing can be provided using features of the present invention.

Prior to or concurrently with making the service request a front end connection or flow is established as indicated by flow 201. The front end flow can be used for multiple service requests between client 200 and location 210 as illustrated in FIG. 2, although only a single request/response is discussed below. References to a "flow" or maintaining a connection or flow are intended to include one or more operations needed to establish or maintain the connection. For example, any one or more of network address translation (NAT), transmission control protocol (TCP) normalization and termination; domain name service (DNS) lookup and translation; or other operations are included.

Client 200 originates a service request 202 to location 210 which, in a preferred embodiment, is a collection of network resources such as a server farm. The server farm includes load balancer 212 and multiple servers such as S1, S2 and S3. Although a preferred embodiment contemplates using a load balancer to perform specific functions, other embodiments can include some or all of the functionality in other devices. For example, functionality may be included in a router, switch, network processor or any other network device. In general, the functions or steps can be performed in a localized or distributed manner, and can be performed at various times, as desired.

Service request 202 causes predetermined script 220 to be executed to divide the service request into component operations such as 222-228. Such component operations can include coordination of requests, invocations, messages, or other communications as are provided by standard languages, protocols or mechanisms such as BPEL, SOAP, Web Service Definition Language (WSDL), etc. The load balancer determines a server or servers to assign to process each component. In FIG. 2, processing of component 222 is shown being handled by three servers S1, S2 and S3. Each server has an associated back-end flow established as 232, 234 and 236. Note that depending on the organization of resources at location 210, it may be possible to engage multiple servers or other devices and processes in a single back-end flow. Each server is shown receiving a request and providing a response back to the load balancer. Such component processing can include providing a web page object, checking a database, performing verification, encoding/decoding data, etc.

Component 224 represents another portion of processing that is necessary to handle the service request. In general, component processing can be parallel or sequential with other component processing. Component 224 processing is assigned by the load balancer to server S3. Note that the existing back-end flow between load balancer 212 and server S3 is maintained so that the overhead of taking down and setting up new flows for separate transactions is reduced. Any requests or other transactions associated with processing component 224 can be performed within a same flow. A device such as a load balancer can direct orchestration using component processing and flow control and can achieve efficiencies that may not be possible when orchestration is attempted by other devices (e.g., servers, network appliances) that operate without knowledge of the status of other servers in the system (e.g., server farm). Other devices, such as the client or devices on the front-end side of the transaction also do not have information about devices or conditions at the back-end. Still other equipment that works at lower layers (e.g., OSI network layers 2 and 3) typically would not have application information to accurately and efficiently perform orchestration functions.

Also, the front-end devices and processes are not local or proximate to the back-end resources so allowing the front-end devices to perform orchestration would introduce delays. Typically, a server farm or other resource location is under the control of a single operational entity such as a business. The consolidation of location and control at the location allows the resources to be set up optimally on a smaller and self-contained network such as a local area network (LAN); campus or corporate area network, etc. Devices at the location are configured optimally for speed and efficiency and may be set up uniquely to work best with other devices at the location.

Load balancer 212 can also take advantage of remote or internal resources in addition to the local resources that are present at location 210. Component 226 illustrates component processing using remote resource 240. For example, a remote resource can include a server at another server farm, a web site, etc. Component 228 illustrates using resource 230 that is local to the load balancer. Such a local resource can be a data object that has been cached in memory. Other examples of local resources include an application program executing on the load balancer, processing cycles from a central processing unit or digital signal processing (DSP) chip, etc.

Results from various component processing are used to generate response 250 to service request 201.

By using the basic types of actions described in FIG. 2 it is possible to implement different types of processing scenarios.

In a preferred embodiment, the existing server load balancing infrastructure including the load balancer device uses TCP and SSL termination, and HTTP parsing, coupled with SOAP termination and the ability to coordinate multiple outstanding server requests. Back-end transactions can be scripted for greater parallelism, speed and efficiency as described in the scenarios, below. Client transparency is maintained, and the functionality is encapsulated in the orchestrated service. In this approach, orchestration tasks can be offloaded from clients and/or servers. The load balancer or other network device implements a multi-transactional back-end protocol and attempts to maintain a singular front-end flow state for multiple back-end transactions. These multiple transactions can include multiple load balanced requests, HTTP parses, security inspections, etc.

Since existing load balancers are already provided with system-wide data such as the historical, projected and instantaneous loading and capacity of servers, the health and availability of servers and resources, etc., this data can also be applied to improve component processing and, hence, improve service request processing. For example, if a script can determine that processing of a particular component (e.g., a record-matching authorization step) must be performed before other components can be attempted then the particular component's processing can be given priority and scheduled for a server with low utilization or expected faster response time. Other approaches can allow result queuing of other component processing and discarding them, for example, if the authorization step failed.

In addition to providing functions such as TCP and HTTP proxying, the load balancer or other network device acting as a proxy can implement SOAP intercept, BPEL-based scripting, etc., and initiate multiple back-end SOAP transactions per flow, based upon the orchestration prescribed by the BPEL script, thus enabling the deployment of network-based Web Service orchestration.

In a persistent rebalance scenario, multiple GET requests are traditionally serialized in HTTP 1.1 persistent connections. In a preferred embodiment, these types of operations can be performed concurrently (i.e., in parallel) or in a pipelined execution so that multiple back-end server connections are sent to multiple servers. For example, a portion of a first component processing (e.g., a GET request) can be proceeding while a second component processing is started. The proxy includes the ability to manage the concurrent connections and to serialize the plurality of responses back to the client over the single front-end persistent connection.

A second scenario uses redundant component processing and discards all but the first-returned result. For example, in an HTTP 3xx redirect response scenario an optimal response time may not be achieved in the event of multiple "Location" field options when a single Uniform Resource Identifier (URI) is the redirect target. For DNS requests, the requests are sent to multiple servers and the fastest response is used. A similar scheme could be used for 3xx responses, where requests are replicated to more than one "Location" and the fastest response is returned to the client. In this case, simple 1:1 TCP normalization can be used, however, management of multiple back-end connections is still required.

Simple BPEL offload can be supported with scripts or policies that implement parallel back-end connections and a simple static mapping function for BPEL script to back-end service configuration. This web service proxy functionality can be integrated into standard load balancers or other devices thereby providing added functionality and value with little (or no) external changes to existing and familiar deliverables. This allows customers to obtain added features without changes to known architecture, interconnectivity, operation and maintenance procedures.

Although embodiments of the invention have been discussed primarily with respect to specific arrangements, formats, protocols, etc. any other suitable design or approach can be used. For example, a "web service" may be any process or application using a standardized protocol such as XML, SOAP, WSDL, UDDI, SOAP/SMLP, etc. In general, any suitable communication protocol or mechanism can be used to request and provide services. Services implicated by the present invention need not be transferred over the web. For example, other approaches such as file transfer protocol (FTP), email, etc., can be used. Other networks or communication methods other than the Internet can be employed. It is anticipated that present protocols and mechanisms will evolve and that new technologies will develop that can be suitable for use with the invention. Features according to embodiments of the invention can be implemented by other designs where front-end flow and/or orchestration are spread across devices/processes.

The embodiments described herein are merely illustrative, and not restrictive, of the invention. For example, the network may include components such as routers, switches, servers and other components that are common in such networks. Further, these components may comprise software algorithms that implement connectivity functions between the network device and other devices.

Any suitable programming language can be used to implement the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    receiving, at a network device that is coupled to a plurality of servers, a service request from a client device, wherein the service request includes multiple GET requests;
    assigning, by the network device, the multiple GET requests for pipelined handling by the plurality of servers;
    performing, by the network device, multiple security inspections corresponding to the service request;
    dividing, by the network device and using a script located at the network device, the service request into component operations;
    identifying, by the network device and using the script, a relationship among the component operations in the service request;
    determining, by the network device, status of individual servers in the plurality of servers;
    based on identifying the relationship among the component operations and upon determining the status of individual servers in the plurality of servers, assigning, by the network device, a first component operation of the service request separately to a first server and a second server from the plurality of servers, wherein a configuration of the first server is independent of a configuration of the second server;
    assigning, by the network device, a second component operation of the service request to a third server in the plurality of servers, wherein the second component operation is executed in serial to execution of the first component operation such that a result of the first component operation is used as an input for the second component operation;
    assigning, by the network device, a third component operation of the service request to a fourth server in the plurality of servers, wherein the third component operation is executed in parallel to execution of the first and second component operations such that a result of the third component operation is independent of results of the first and second component operations;
    obtaining, by the network device, data separately from the first and second servers in response to the first component operation, wherein the data is obtained from one of the first or second servers earlier than from the other of the first or second servers;
    sending, by the network device, the data that is obtained earlier from the first and second servers to the third server such that the second component operation on the third server can be completed while discarding the data that is obtained later from the first and second servers;
    obtaining, by the network device, a first result from the third server in response to the second component operation and a second result from the fourth server in response to the third component operation;
    generating, by the network device, a response to the service request using the first and second results; and
    sending, by the network device, the response to the service request to the client device.

2. The method of claim 1, wherein the network device includes a load balancer.

3. The method of claim 1, wherein identifying component operations in the service request comprises:
    identifying component operations in the service request using one of Business Process Execution Language, Simple Object Access Protocol, Extended Markup Language, or Web Service Choreography Interface.

4. The method of claim 1, wherein assigning the first, second, or third component operations comprises:
    based on identifying the relationship among the first, second and third component operations and upon determining the status of individual servers in the plurality of servers, determining, using the script, an order of assignment of the first, second and third component operations and an allocation of the first, second and third component operations to the plurality of servers such that assigning the first, second, or third component operations using the script is based on information at the network device and is independent of the information located at the client device.

5. The method of claim 1, wherein the service request includes one of Hyper Text Transfer Protocol (HTTP) parses, File Transfer Protocol (FTP) services, or email services.

6. The method of claim 1, comprising performing quality of service operations, in which the network device assigns component operations to a server with low utilization or expected faster response time.

7. The method of claim 1, wherein the service request is one of Network Address Translation (NAT) request, or a Domain Name Service (DNS) request.

8. The method of claim 1, wherein the service request includes an HTTP 3xx redirect response, and wherein the first component operation is assigned to two or more locations.

9. The method of claim 1, comprising:
    processing a fourth component operation of the service request by the network device using a resource that is available locally at the network device, wherein the resource available locally at the network device includes one of a resource cached in memory at the network device, an application program executing on the network device, or processing cycles from a central processing unit or digital signal processing chip (DSP).

10. The method of claim 1, wherein one of the first, second, third or fourth servers is geographically proximate to the network device while another of the first, second, third and fourth servers is in a location that is remote compared to a location of the network device.

11. The method of claim 1, comprising:
in response to assigning the third component operation of the service request to the fourth server, establishing, by the network device, a connection between the network device and the fourth server associated with the third component operation;
assigning, by the network device, a fourth component operation of the service request to the fourth server; and
based on assigning the fourth component operation of the service request to the fourth server, exchanging, by the network device and with the fourth server, information associated with the fourth component operation over the connection established for the third component operation.

12. A method comprising:
receiving, at a network device that is coupled to a plurality of servers, a service request from a client device, wherein the service request includes multiple GET requests;
performing, by the network device, multiple security inspections corresponding to the service request;
identifying, by the network device, component operations in the service request;
assigning, by the network device, the multiple GET requests for pipelined handling by multiple servers, comprising:
  assigning a first component operation separately to a first server and a second server from the plurality of servers, wherein a configuration of the first server is independent of a configuration of the second server;
  processing a second component operation separately by the network device using a resource that is available locally at the network device;
  obtaining first data separately from the first and second servers in response to the first component operation, wherein the first data is obtained from one of the first or second servers earlier than from the other of the first and second servers;
  using the first data that is obtained earlier and discarding the first data that is obtained later;
  obtaining second data separately in response to processing the second component operation by the network device using the resource that is available locally at the network device;
  generating a response to the service request using the first data that is obtained earlier and the second data; and
  sending to the client device the response to the service request.

13. A network device comprising:
a processor;
a machine readable storage medium including instructions executable by the processor for performing operations including:
  receiving, at a network device that is coupled to a plurality of servers, a service request from a client device, wherein the service request includes multiple GET requests;
  assigning, by the network device, the multiple GET requests for pipelined handling by the plurality of servers;
  performing, by the network device, multiple security inspections corresponding to the service request;
  dividing, by the network device and using a script located at the network device, the service request into component operations;
  identifying, by the network device and using the script, a relationship among the component operations in the service request;
  determining, by the network device, status of individual servers in the plurality of servers;
  based on identifying the relationship among the component operations and upon determining the status of individual servers in the plurality of servers, assigning, by the network device, a first component operation of the service request separately to a first server and a second server from the plurality of servers, wherein a configuration of the first server is independent of a configuration of the second server;
  assigning, by the network device, a second component operation of the service request to a third server in the plurality of servers, wherein the second component operation is executed in serial to execution of the first component operation such that a result of the first component operation is used as an input for the second component operation;
  assigning, by the network device, a third component operation of the service request to a fourth server in the plurality of servers, wherein the third component operation is executed in parallel to execution of the first and second component operations such that a result of the third component operation is independent of results of the first and second component operations;
  obtaining, by the network device, data separately from the first and second servers in response to the first component operation, wherein the data is obtained from one of the first or second servers earlier than from the other of the first or second servers;
  sending, by the network device, the data that is obtained earlier from the first and second servers to the third server such that the second component operation on the third server can be completed while discarding the data that is obtained later from the first and second servers;
  obtaining, by the network device, a first result from the third server in response to the second component operation and a second result from the fourth server in response to the third component operation;
  generating, by the network device, a response to the service request using the first and second results; and
  sending, by the network device, the response to the service request to the client device.

14. The network device of claim 13, wherein the instructions for assigning the first, second, or third component operations include instructions that are configured to cause the processor to perform operations comprising:
based on identifying the relationship among the first, second and third component operations and upon determining the status of individual servers in the plurality of servers, determining, using the script, an order of assignment of the first, second and third component operations, and an allocation of the first, second and third component operations to the plurality of servers such that assigning the first, second, or third component operations using the script is based on information at the network device and is independent of the information located at the client device.

15. The network device of claim 13, wherein identifying component operations in the service request comprises:
   identifying component operations in the service request using one of Business Process Execution Language, Simple Object Access Protocol, Extended Markup Language, or Web Service Choreography Interface.

16. The network device of claim 13, wherein the service request includes one of Hyper Text Transfer Protocol (HTTP) parses, File Transfer Protocol (FTP) services, or email services.

17. A non-transitory machine-readable storage medium storing instructions executable by a processor that, when executed, configured to cause the processor to perform operations comprising:
   receiving, at a network device that is coupled to a plurality of servers, a service request from a client device, wherein the service request includes multiple GET requests;
   assigning, by the network device, the multiple GET requests for pipelined handling by the plurality of servers;
   performing, by the network device, multiple security inspections corresponding to the service request;
   dividing, by the network device and using a script located at the network device, the service request into component operations;
   identifying, by the network device and using the script, a relationship among the component operations in the service request;
   determining, by the network device, status of individual servers in the plurality of servers;
   based on identifying the relationship among the component operations and upon determining the status of individual servers in the plurality of servers, assigning, by the network device, a first component operation of the service request separately to a first server and a second server from the plurality of servers, wherein a configuration of the first server is independent of a configuration of the second server;
   assigning, by the network device, a second component operation of the service request to a third server in the plurality of servers, wherein the second component operation is executed in serial to execution of the first component operation such that a result of the first component operation is used as an input for the second component operation;
   assigning, by the network device, a third component operation of the service request to a fourth server in the plurality of servers, wherein the third component operation is executed in parallel to execution of the first and second component operations such that a result of the third component operation is independent of results of the first and second component operations;
   obtaining, by the network device, data separately from the first and second servers in response to the first component operation, wherein the data is obtained from one of the first or second servers earlier than from the other of the first or second servers;
   sending, by the network device, the data that is obtained earlier from the first and second servers to the third server such that the second component operation on the third server can be completed while discarding the data that is obtained later from the first and second servers;
   obtaining, by the network device, a first result from the third server in response to the second component operation and a second result from the fourth server in response to the third component operation;
   generating, by the network device, a response to the service request using the first and second and third results; and
   sending, by the network device, the response to the service request to the client device.

* * * * *